US005753734A

United States Patent [19]

Maruyama

[11] Patent Number: 5,753,734
[45] Date of Patent: May 19, 1998

[54] COMPOSITION FOR A COATING FILM WITH WATER-REPELLENT PROPERTIES

[75] Inventor: Teruhito Maruyama, Kanagawa, Japan

[73] Assignee: Dow Corning Asia, Ltd., Tokyo, Japan

[21] Appl. No.: 769,609

[22] Filed: Dec. 16, 1996

[30] Foreign Application Priority Data

Dec. 15, 1995 [JP] Japan ................... 7-347829

[51] Int. Cl.[6] ........................... C08K 5/54
[52] U.S. Cl. .................... 524/267; 525/477
[58] Field of Search ............. 524/267; 525/477

[56] References Cited

U.S. PATENT DOCUMENTS 5,346,940  9/1994  Brassard et al. ............ 524/267

FOREIGN PATENT DOCUMENTS

| 39382 | 6/1973 | Japan . |
| 215570 | 9/1991 | Japan . |
| 244966 | 10/1991 | Japan . |
| 45181 | 2/1992 | Japan . |
| 287487 | 11/1993 | Japan . |

Primary Examiner—Melvyn I. Marquis
Attorney, Agent, or Firm—Arne R. Jarnholm

[57] ABSTRACT

What is disclosed is a new composition for forming coating water repellent films with a very smooth water-repellent surface. The composition imparts an attractive appearance to the coating film and assures that less time is needed for water to descent down a substrate.

3 Claims, No Drawings

COMPOSITION FOR A COATING FILM WITH WATER-REPELLENT PROPERTIES

FIELD OF THE INVENTION

The present invention relates to a water-repellent film forming composition suitable for the formation of smooth coating films with water-repellent properties.

DESCRIPTION OF THE PRIOR ART

Compositions that contain powders and produce water-repellent properties after application on various substrates are known from Japanese Laid-Open Patent Applications [Kokai] No. 48-39382, No. 3-215570, and No. 3-244996.

Japanese Laid-Open Patent Applications No. 48-39382 discloses a technique according to which water-repellent properties are imparted to the surface of a substrate by coating it with a hydrophobic substance that contains (a) water drops with microscopic powder having an average diameter less than 2 μm and (b) a contact angle greater than 90°, whereby a hydrophobic layer of microscopic particles with an average diameter of 5 to 10 μm is formed on the aforementioned surface.

The technique disclosed in Japanese Laid-Open Patent Applications [Kokai] No. 3-215570 relates to a water-repellent coating material which consists of (a) a hydrophobic microscopic powder having a surface tension below 32 dyn/cm and (b) one or two, or more than two resins having hygroscopicity below 0.5% and selected from the group consisting of a silicone resins, fluoro resins, polyether sulfonic resins, polyphenylene sulfide resins, acrylic resins, epoxy resins, and polyimide resins.

The technique disclosed in Japanese Laid-Open Patent Applications No. 3-244996 relates to a water-repellent coating composition which consists of (a) a porous organic or inorganic powder with 4 diameter particles and (b) a solution of a silicone or a fluororesin compound.

The technique disclosed in Japanese Laid-Open Patent Application No. 4-45181 relates to a composition for water repellent coatings, which consists of a solution that contains a silicone-type resin having structural units in the form of three-dimensional cross-linked members with an R/Si ratio below 1.7 and fine inorganic powder particles having their surface treated to impart to them high hydrophobic properties.

In their earlier Patent Application No. 5-287487, the inventors of this application disclosed a composition for forming coating films combining water repellent and anti-fungal properties, the composition being characterized by comprising: (a) 15 to 75 wt. % of a hydrophobic filler which had been treated with a hydrophobic agent having organic groups, the filler having a degree of hydrophobic treatment as calculated per weight of carbon which is higher than 2.7 wt. %; and (b) 25 to 85 wt. % of a binder.

All prior art compositions comprise (a) powder particles and (b) a hydrophobic binder.

As shown above, all water repellent films described above which consist of (a) fine powder and (b) a film-forming agent having hydrophobic properties were based on the concept that drops of water will have tendency to flow down. This is based on the fact that the presence of silica on the surface of the water repellent coating film creates a certain roughness on the surface.

If water repellent films are prepared from the above-described materials, and such films are in a close proximity to another material so that a microscopic space is left between them, water drops which are split under the water repelling effect of the above-mentioned water repellent films begin to run down and come in contact with the aforementioned other material. Under the effect of surface tension, these drops either remain between both materials and their descent is hindered or the descent a longer time.

As compared with the above, in the case of a water repellent film having a structure without a filler, the film surface is smoother, and drops of water that adhered to the film surface would descend more easily.

In the case of the water repellent film of the last-mentioned type, water drops will be less sticky to other materials that are in a close proximity to the water repellent film with a microscopic space between both materials, so that a smaller amount of water will be kept between both materials. As a result water drops will remain in contact only with the water repellent film and will descent more easily. For this reason, new drops present on the water repellent surface will merge with those already there, which will further facilitate their descent.

THE PRESENT INVENTION

It is an object of the present invention to provide a new composition for forming water repellent films, that impart an attractive appearance to the coating film and that assure that less time is needed for water to descend down a surface. The above-mentioned composition allows a very smooth water repellent film surface.

A composition comprising: (a) 100 parts by weight of a silicone resin consisting essentially of units selected from (i) $R_2SiO_{2/2}$ and (ii) $R_1SiO_{3/2}$ wherein R is an alkyl group having 1 to 5 carbon atoms and, (b) 0.1 to 90 parts by weight for every 100 parts of (a) of polydialkylsiloxane having the formula

$(R^1)_3SiO(R^1SiO)_mSi(R^1)_3$ wherein each $R^1$ is a radical independently selected from a group consisting of alkyl groups having 1 to 5 carbon atoms, and m is a number at which the viscosity of the polydialkylsiloxane is in the range of 50 to 1000 cSt. at 25°.

The silicone resin of the present invention that forms a component (a) consists essentially of $R_2SiO_{2/2}$ units (D units) and $R_1SiO_{3/2}$ units (T units) is usually known as a DT-resin. This DT-resin can be synthesized by conventional methods. For example, it can be prepared by subjecting a mixture of $R_2SiCl_2$ and $RSiCl_3$, wherein R is an alkyl group, to co-hydrolysis, with a subsequent condensation reaction. The method and conditions of preparation may differ, but with steady normal proportions, the DT-resins normally contain some unreacted silanol groups. Furthermore, DT-resins also depend on purity of starting materials used for synthesis, and structural units of $R_3SiO_{1/2}$ will be formed, although in small quantities. The DT-resin which forms component (a) of the present invention is a silicone resin that consists essentially only of $R_2SiO_{2/2}$ units and $R_1SiO_{3/2}$ units. Although some impurities are present in the above-mentioned starting materials and other units may be formed, their quantity is so small that the aforementioned impurities will have no effect, and their presence can be tolerated.

In the above-mentioned component (a), R is represented by a methyl group, ethyl group, propyl group, butyl group, pentyl group, and the like.

The following are specific examples of component (a), which should not be construed as limiting:

(1) $\{(CH_3)_2SiO_{2/2}\}m \{(CH_3SiO_{3/2}\}_n$, where m:n=1:0.43 to 1:10

(2) $\{(CH_3)(CH_3 CH_2) SiO_{2/2}\}_m \{(CH_3SiO_{3/2}\}$ n, where m:n=1:0.43 to 1:10

(3) $\{(CH_3)_2 SiO_{2/2}\}_m \{(CH_3CH_2SiO_{3/2}\}$ n, where m:n=1:0.43 to 1:10

(4) $\{(CH_3)_2SiO_{2/2}\}_r \{(CH_3)(CH_3 CH_2) SiO_{2/2}\}_m \{(CH_3SiO_{3/2}\}_n$, where r+m:n=1:0.43 to 1:10 r:m=1:0.5 to 1:2

(5) $\{(CH_3)_2SiO_{2/2}\}_r \{(CH_3 SiO_{3/2}\}_m \{(CH_3CH_2SiO_{3/2}\}_n$. where r:m+n=1:0.43 to 1:10 m:n=1:0.5 to 1:2.

The DT resin which is component (a) of the composition of the present invention is normally used in the form of a weak solution in a predetermined organic solvent, but it can also be dissolved in an inorganic solvent.

The following are examples of polydialkylsiloxane which represents component (b) of the composition of the present invention having the general formula: $R^1_3SiO$—$(R^1_2SiO)$ m—Si $R^1_3$. These examples should not be, however, construed as limiting.

(1) $(CH_3)_3SiO$—$\{(CH_3)_2SiO\}m$—$Si(CH_3)_3$, (where m is a number that ensures a viscosity at 25° C. within the range of 50 to 1,000 cSt);

(2) $(CH_3)_3SiO$—$\{(CH_3)_2SiO\}m \{(CH_3)(CH_3CH_2) SiO\}$ n—$Si(CH_3)_3$, (where m is a number that ensures a viscosity at 25° C. within the range of 50 to 1,000 cSt);

(3) $(CH_3)_2 (CH_3CH_2) SiO$—$\{(CH_3)_2SiO\}m$—$Si(CH_3)_2 (CH_3CH_2)$ (where m is a number that ensures a viscosity at 25° C. within the range of 50 to 1,000 cSt);

(4) A mixture of (1) and (2) given above.

(5) A mixture of (1) and (2) given above.

Normally the R/Si ratio in the above-mentioned component (a) is $1 < R/Si \leq 1.7$, and preferably $1.1 < R/Si \leq 1.5$.

The above-mentioned component (a) contains silanol groups. It is recommended that these silanol groups be in the total molar ratio of 10 mole % to the sum of $[R_2SiO_{2/2}]$ units and $[R_1SiO_{3/2}]$ units, wherein the silanol can be expressed as $HO_{1/2}$.

It is required that the above-mentioned polydialkylsiloxane of component (b) of the present invention have a viscosity ranging from 50 to 1,000 cSt at 25° C.

As far as the ratio between component (a) and component (b) is concerned, it should be noted that if the component (b) is used in an amount less than 0.1 parts by weight, the water repellent effect is inadequate, and when it is used in an amount of 90.0 parts by weight, the cured film has impaired properties. In view of the above, it is recommended that the upper limit of content of component (b) preferably be 80.0 parts by weight, most preferably, 60.0 parts by weight. Similarly, the preferred range for the lower limit should be above 0.5 parts by weight, most preferably, higher than 1.0 part by weight.

Normally, the composition for forming a water repellent film is used when diluted with a solvent. The following are examples of the solvents suitable for this purpose:

aromatic solvents such as toluene, xylene;

ketone solvents such as acetone, methylethyl ketone, methyl-isobutyl ketone;

aliphatic saturated hydrocarbon solvents such as hexane, heptane, octane;

ether solvents such as isopropyl ether;

chlorine solvent such as chloroform, trichlorohydroxy ethane;

silane solvents such as trimethylmethoxy silane, dimethyldimethoxy silane;

and other silicone volatile solvents.

These examples should not be construed as limiting.

The above-mentioned solvents can be used individually or in combinations of two or more solvents. It is recommended that the solvents be used in an amount of 10.0 to 94.9 wt. % of the total weight of both components (a) and (b).

According to the invention, curing by silanol condensation normally occurs without using a curing catalyst. If necessary, however, a curing catalyst can be added to the above-mentioned composition of the invention.

Curing catalysts suitable for the purposes of the present invention are those normally used for hydrolysis condensation reactions involving silicone resins. They can be, e.g., in the form of organometalic compounds, amine compounds, silazanes, and the like. These specific compositions are given as examples and should not be construed as limiting the invention.

The organometalic compounds can be represented by organic acid salts of lead, tin, zinc, cobalt, and titanium. Organic acids can be represented by octyl acid, acetic acid, lauric acid, and maleic acid. The following are specific examples of organometalic compounds: dibutyltindiacetate, dibutyltindilaurate, dioctyltindilaurate, tin octanoate, tin octoate, stannous oleate, stannous, tetraisopropyltitanate, diisopropylbis(acetoacetic/acid ethyl) titanium.

Furthermore, amine compounds can be represented by dibutylamines, aminosilanes such as aminopropyltrimethoxy silane, methyldimethoxy-di-n-hexyl aminosilane), di-n-hexylamine, triethanolamine, dicyclohexylamine, di-n-octylamine, triethyl amine, diethyl amine, and trimethylbenzyl amine.

Silazanes can be represented by hexamethyl disilane.

The curing catalysts can be used in an amount of 0.5 to 15 parts by total weight of component (a).

The water repellent coating film of the present invention is normally prepared by diluting a composition consisting of component (a) and component (b) and, if necessary, component (c) in a solvent, spreading the resulting solution over a substrate, and curing the coating by heating. If not otherwise specified and the coating film is formed by curing through complete evaporation of the solvent, heating is normally carried out at a temperature between 120° and 200° C. during 10 to 30 minutes. If the curing catalyst is added, curing can be performed in a more efficient manner than in the case where no catalyst is used, e.g., with heating to 100° F. for 1 to 5 minutes.

The coating film can be formed of the composition of the present invention by applying the composition of the invention to a substrate to which water repelling properties have to be imparted or by impregnating the substrate with the composition of the invention. In order to provide the most favorable film forming conditions during application or impregnation, concentration of the solution prepared by diluting the composition in the solvent, should be adjusted. Application can be carried out by dipping, impregnating, dip-spreading, impregnation-spreading, roller coating, brushing, spraying, and the like.

Although there are no special limitations with regard to the thickness of the coating film applied to a substrate, it is recommended that the thickness of the coating layer be between 0.1 to 5 μm in the cured state.

Although there are no special limitations with regard to materials to be used as substrates such materials can be represented by metals, plastics, inorganic materials, rubber, glass, and fibers.

The following are examples of parts, materials and articles that require substantially water repelling properties: parts used in refrigerators, freezers, glass used for construction, parts from which water has to run down such as parts of kitchen appliances, lavatory equipment, bathtubs, as well as parts working under high humidity conditions.

The invention will now be described with reference to specific practical and comparative examples. These examples should not be, however, construed as limiting the invention.

The following silicone resins were used in the practical and comparative examples given below:

(1) Silicone resin (1)

Conditions required for the component (a) of the present invention were met by using a methylsilicone resin (DT resin) which contained only D-units in the form of $R_2SiO_{2/2}$ and T-units in the form of $R_1SiO_{3/2}$, wherein R was a methyl group; R/Si was 1.15, and viscosity was 20 cP (temperature 25° C., 50 wt. % of toluene-diluted product).

(2) Silicone resin (2)

A methylsilicone (MDT) resin containing $R_2SiO_{2/2}$ units, $RSiO_{3/2}$ unit, and $R_3SiO_{1/2}$ units (M units), wherein R is a methyl group, were used. Viscosity was 30 cP (temperature 25° C., without any solvent used). Since the presence of the M-units affected the drop descent time criterion and the external appearance of the coating film, the conditions of the absence of harmful effects obtained with the use of the D- and T- units only were not met, so that this composition could not meet the requirements of component (a) according to the invention.

(3) Silicone resin (3)

A methylphenyl silicone resin (DT-resin), in which one part of R's in silicone resin (1) was replaced by a phenyl group, and the remaining R's were represented by a methyl group, was used. R/Si ratio was 1.3, and viscosity was 120 cP (25° C., 50 wt. % xylene-diluted product). The conditions required for component (a) according to the invention were not met, because one part of the R's was replaced by phenyl groups.

(4) Silicone resin (4)

A methylphenyl silicone resin (DT resin), in which one part of R's in silicone resin (1) was replaced by a phenyl group and the remaining R's were represented by a methyl group, was used. The R/Si ratio was 1.6, and viscosity was 160 cP (25° C., 50 wt. % xylene-diluted product). The conditions required for the components (a) according to the invention were not met, because one part of the R's was replaced by phenyl groups.

The following polydimethyl siloxanes were used in the practical and comparative examples given below:

(i) Polydimethylsiloxane (1)

The above-mentioned polydimethylsiloxane was represented by the following formula:

Me$_3$SiO—(Me$_2$SiO) m—SiMe$_3$

Viscosity was 100 cSt at 25° C. Thus conditions required for the component (b) of the present invention were satisfied.

(i) Polydimethyl siloxane (2)

The above-mentioned polydimethylsiloxane was represented by the following formula:

Me$_3$SiO—(Me$_2$SiO) m—SiMe$_3$

Viscosity was 350 cSt at 25° C. Thus conditions required for the component (b) of the present invention were satisfied.

Various compositions of the practical examples of the invention and of the comparative examples, as well as the results of their evaluation are given in Tables 1 through 4. The following methods were used for evaluating water repelling properties and appearance of the cured films presented in the tables.

Methods and Criteria for Evaluation of Water Repelling Properties

Methods of Evaluation (1) Each coating composition was applied to an aluminum plate (JIS-A1100) by dipping. The coating film having a thickness between 1 and 2 μm was formed by appropriately curing the coating on the aluminum for 20 minutes at 200°.

(2) An aluminum plate was put in a horizontal position, and one 2 μm drop of distilled water was dripped into a predetermined position on the surface of the coating film with a micropippet. The drop remained intact.

(3) Within 10 to 15 seconds after dripping, while one edge of the aluminum plate was kept in contact with the desk, the other edge was turned to orient the plate at a right angle to the desk. In this position, the time it took for the drop to descend through a distance of 50 mm was measured.

(4) The condition on the surface of the cured film was evaluated by visual inspection.

(5) The aforementioned measurements were performed at 5 points of the aluminum plate and an arithmatical mean was used as a water drop descent time mentioned in item (3) above.

Evaluation criteria

The following grades were used for evaluating the water drop descent time:

| Grade in the Table | |
|---|---|
| | Water Drop Descent Time |
| 5 | within 30 sec |
| 4 | 31 to 60 sec |
| 3 | 61 to 120 sec |
| 2 | 121 to 180 sec |
| 1 | 181 to 600 sec |
| x | did not pass a predetermined distance after 601 sec |
| Surface Condition of the Cure Film | |
| | Result of Visual Inspection |
| [satisfactory] | The following three conditions are satisfied if: there are no defects, cracks or peeling on the surface; no whitening on the film; no spots on the surface. |
| [unsatisfactory] | At least one of the aforementioned three conditions is not satisfied. |

Acceptance Condition

In accordance with the invention, the coating film was accepted if the water-drop descent time criterion was within 5 to 1 grade and if the condition of the coating film surface was evaluated as "satisfactory". In all other cases the coating films were rejected.

TABLE 1

| | Practical Examples | | | | |
|---|---|---|---|---|---|
| | 1 | 2 | 3 | 4 | 5 |
| Silicone resin① | 25.0 parts by weight | 25.0 parts by weight | 50.0 parts by weight | 35.0 parts by weight | 15.0 parts by weight |
| Silicone resin② | — | — | — | — | — |
| Poly-dimethyl siloxane① | 1 part by weight | — | 1 part by weight | 1 part by weight | 1 part by weight |
| Poly-dimethyl siloxane② | — | 1 part by weight | — | — | — |
| Solvent | 74.0 parts by weight | 74.0 parts by weight | 49.0 parts by weight | 64.0 parts by weight | 84.0 parts by weight |
| Water-repellent properties | 5 | 5 | 4 | 4 | 5 |
| Film appearance | Satisf. | Satisf. | Satisf. | Satisf. | Satisf. |
| Final evaluation | Accepted | Accepted | Accepted | Accepted | Accepted |

TABLE 2

| | Practical Examples | | | | | |
|---|---|---|---|---|---|---|
| | 6 | 7 | 8 | 9 | 10 | 11 |
| Silicone resin① | 25.0 parts by weight | 25.0 parts by weight | 25.0 parts by weight | 25.0 parts by weight | 25.0 parts by weight | 25.0 parts by weight |
| Silicone resin② | | | | | | |
| Poly-dimethyl siloxane① | 10 parts by weight | 5 parts by weight | 2 parts by weight | 1 part by weight | 0.5 parts by weight | 0.1 parts by weight |
| Poly-dimethyl siloxane② | — | — | — | — | — | — |
| Solvent | 65.0 parts by weight | 70.0 parts by weight | 73.0 parts by weight | 74.0 parts by weight | 74.5 parts by weight | 74.9 parts by weight |
| Water-repellent properties | 5 | 5 | 5 | 5 | 5 | 5 |
| Film appearance | Satisf. | Satisf. | Satisf. | Satisf. | Satisf. | Satisf. |
| Final evaluation | Accepted | Accepted | Accepted | Accepted | Accepted | Accepted |

TABLE 3

| | Comparative Examples | | | |
|---|---|---|---|---|
| | 1 | 2 | 3 | 4 |
| Silicone resin① | 25.0 parts by weight | — | — | — |
| Silicone resin② | — | 25.0 parts by weight | 25.0 parts by weight | 25.0 parts by weight |
| Poly-dimethyl siloxane① | — | 1.0 part by weight | — | — |
| Poly-dimethyl siloxane② | — | — | 1.0 part by weight | — |
| Solvent | 75.0 parts by weight | 74.0 parts by weight | 74.0 parts by weight | 75.0 parts by weight |
| Water-repellent properties | x | 1 | 1 | x |
| Film appearance | Satisf. | Unsatisf. | Unsatisf. | Satisf. |
| Final evaluation | Unaccepted | Unaccepted | Unaccepted | Unaccepted |

TABLE 4

|  | Comparative Examples | | | | | |
|---|---|---|---|---|---|---|
|  | 5 | 6 | 7 | 8 | 9 | 10 |
| Silicone resin③ | 25.0 parts by weight | 25.0 parts by weight | 25.0 parts by weight | — | — | — |
| Silicone resin④ | — | — | — | 25.0 parts by weight | 25.0 parts by weight | 25.0 parts by weight |
| Polydimethylsiloxane① | 1 part by weight | — | — | 1 part by weight | — | — |
| Polydimethylsiloxane② | — | 1 part by weight | — | — | 1 part by weight | — |
| Solvent | 74.0 parts by weight | 74.0 parts by weight | 75.0 parts by weight | 74.0 parts by weight | 74.0 parts by weight | 75.0 parts by weight |
| Water-repellent properties | x | x | x | x | x | x |
| Film appearance | Unsatisf. | Unsatisf. | Unsatisf. | Unsatisf. | Unsatisf. | Unsatisf. |
| Final evaluation | Unaccepted | Unaccepted | Unaccepted | Unaccepted | Unaccepted | Unaccepted |

The present invention provides a composition for the formation of coating films with water-repellent properties, the composition having component (a) and component (b) combined in appropriate proportions and making it possible to form a coating film with water-repellent properties and of an attractive appearance.

That which is claimed:

1. A composition comprising:
   (a) 100 parts by weight of a silicone resin consisting essentially of (i) $R_2SiO_{2/2}$ and (ii) $R_1SiO_{3/2}$ units, wherein R is an alkyl group having 1 to 5 carbon atoms, which R groups may be the same or different; and
   (b) 0.1 to 90 parts, by weight, for every 100 parts of (a), a polydialkylsiloxane having the formula $(R^1)_3SiO(R_2{}^1SiO)_m Si(R^1)_3$ wherein each $R^1$ is an alkyl group having 1 to 5 carbon atoms, which $R^1$ groups may be the same or different, and m is a number at which the viscosity of the polydialkylsiloxane is in the range of 50 to 1,000 cSt. at 25° C.

2. A composition in accordance with claim 1 which is a water repellent coating.

3. A composition in accordance with claim 1 further comprising (c) 0.5 to 15 parts, by weight, for every 100 parts of (a), the silicone resin, of a hydrolysis condensation catalyst.

* * * * *